US011233475B2

(12) United States Patent
Valasek et al.

(10) Patent No.: US 11,233,475 B2
(45) Date of Patent: Jan. 25, 2022

(54) DC BUS PRECHARGE SYSTEM

(71) Applicant: Rockwell Automation Technologies, Inc., Mayfield Heights, OH (US)

(72) Inventors: James J Valasek, Mequon, WI (US); Nickolay Guskov, Mequon, WI (US); Gary Skibinski, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 63 days.

(21) Appl. No.: 16/874,017

(22) Filed: May 14, 2020

(65) Prior Publication Data

US 2021/0359632 A1  Nov. 18, 2021

(51) Int. Cl.
*H02P 27/04* (2016.01)
*H02M 5/42* (2006.01)

(52) U.S. Cl.
CPC .............. *H02P 27/04* (2013.01); *H02M 5/42* (2013.01)

(58) Field of Classification Search
CPC ................................ H02P 27/04; H02M 5/42
See application file for complete search history.

(56) References Cited

U.S. PATENT DOCUMENTS

| 5,483,142 | A | 1/1996 | Skibinski et al. |
| 6,295,215 | B1 | 9/2001 | Faria et al. |
| 6,798,647 | B2* | 9/2004 | Dickie .................. G06F 1/1616 345/158 |
| 7,005,829 | B2 | 2/2006 | Schnetzka |
| 7,676,836 | B2 | 3/2010 | Prigent et al. |
| 7,830,036 | B2 | 11/2010 | Wei et al. |
| 7,929,323 | B2 | 4/2011 | Schmidt |
| 8,154,895 | B2 | 4/2012 | Gilmore |
| 8,816,625 | B2 | 8/2014 | Kopiness et al. |

(Continued)

FOREIGN PATENT DOCUMENTS

| CN | 105871295 A | 8/2016 |
| CN | 107894531 A | 4/2018 |
| CN | 108199575 A | 6/2018 |

OTHER PUBLICATIONS

European Search Report and European Search Opinion dated Sep. 15, 2021 Application No. EP21172003, 8 pages.

*Primary Examiner* — Rina I Duda
(74) *Attorney, Agent, or Firm* — Fay Sharpe LLP

(57) ABSTRACT

A precharge system for precharging a DC bus circuit includes a first input, first and second circuit branches, and a controller, where the first circuit branch includes a first contactor between the first input and an AC to DC converter, the second circuit branch has: a disconnect switch coupled to the first input; a variable frequency drive (VFD) with an AC input coupled to the disconnect switch; an inductor coupled to an AC output of the VFD; and a second contactor coupled to the inductor. The precharge VFD provides precise control of the precharge operation such as charging time, current limiting, short-circuit and ground fault protection, monitoring DC Bus capacitance and verifies the health of the shared DC bus circuit through startup diagnostic. The controller opens the first contactor and closes the second contactor and the disconnect switch in a first mode to precharge the DC bus circuit using the VFD, and in a second mode, the controller closes the first contactor and opens the second contactor and the disconnect switch.

20 Claims, 7 Drawing Sheets

(56) References Cited

U.S. PATENT DOCUMENTS

| | | |
|---|---|---|
| 8,953,296 B2 | 2/2015 | Weiss et al. |
| 9,667,177 B1 * | 5/2017 | Li .......................... H02P 27/06 |
| 2002/0070117 A1 * | 6/2002 | Gutierrez, Jr. ........... C25D 5/18 |
| | | 205/80 |
| 2011/0278931 A1 | 11/2011 | Johnson, Jr. |
| 2013/0242623 A1 * | 9/2013 | Wei ....................... H02M 5/458 |
| | | 363/37 |
| 2014/0217964 A1 * | 8/2014 | Fujimoto .............. H02M 3/335 |
| | | 320/107 |
| 2016/0079905 A1 * | 3/2016 | Swamy .................. H02P 25/18 |
| | | 318/806 |

\* cited by examiner

DC BUS PRECHARGE SYSTEM

BACKGROUND INFORMATION

The subject matter disclosed herein relates to DC bus precharging for power conversion systems.

BRIEF DESCRIPTION

Disclosed examples include a system having a first input, an AC to DC converter, first and second contactors, and a second branch with a VFD for precharging a shared (e.g., system) DC bus, referred to hereinafter as a DC bus circuit. The first input is configured to be coupled to an AC power source, and the AC to DC converter has a DC output coupled to a DC bus circuit. A first contactor is coupled in a first circuit branch between the first input and the input of the AC to DC converter. The second circuit branch includes a second contactor, an inductor, a disconnect switch and the VFD. The disconnect switch is coupled between the first input and the AC input of the VFD, and the VFD is coupled between the disconnect switch and the inductor. The inductor is coupled between the AC output of the VFD and the second contactor, and the second contactor is coupled between the inductor and the DC bus circuit.

Disclosed examples include a precharge system having a first input configured to be coupled to an AC power source, as well as first and second circuit branches, and a controller. The first circuit branch has a first contactor coupled between the first input and an AC to DC converter. The second circuit branch has a disconnect switch coupled to the first input, a VFD, an inductor coupled to an AC output of the VFD, and a second contactor coupled to the inductor. The controller opens the first contactor and closes the second contactor and the disconnect switch in a first mode to prevent direct current flow from the first input to the AC to DC converter and allow current flow from the AC output of the VFD through the inductor. In a second mode, the controller closes the first contactor and opens the second contactor and the disconnect switch to allow direct current flow from the first input to the AC to DC converter and prevent current flow from the AC output of the VFD through the inductor.

Another disclosed example provides a method for precharging a DC bus circuit, including coupling a VFD between an AC power source and a DC bus circuit, charging the DC bus circuit with the VFD, and, in response to the voltage of the DC bus circuit reaching the threshold value, disconnecting the VFD from the DC bus circuit, coupling an AC to DC converter to the DC bus circuit, and regulating the voltage of the DC bus circuit using the AC to DC converter.

DETAILED DESCRIPTION

Power conversion systems often use shared DC bus architectures, in which multiple DC loads are connected to a single bus. For example, a shared bus system can accommodate multiple inverters to power respective motors, as well as one more capacitor banks. High capacity systems with high power requirements can include large DC bus capacitors designed to operate at relatively high DC voltages. Upon starting such systems, the DC bus capacitor or capacitors need to be charged to a sufficient voltage for safe operation of the connected inverters or other DC loads. However, charging a capacitive load by simple connection to an input voltage source can lead to excessive inrush current levels. In this regard, the amount of loading and bus capacitance may vary, for example, when certain loads are inactivated and/or disconnected from the shared bus. Limiting the charging current, on the other hand, lengthens the precharging time. Long precharge/startup times are undesirable for industrial installations. Difficulties can occur when a precharge circuit becomes physically too large, complicated and/or exceeds expected precharge times. Problems also occur when the multiple different inverter power ratings exceed the maximum precharge capability of a shared DC bus system.

Figure 1:
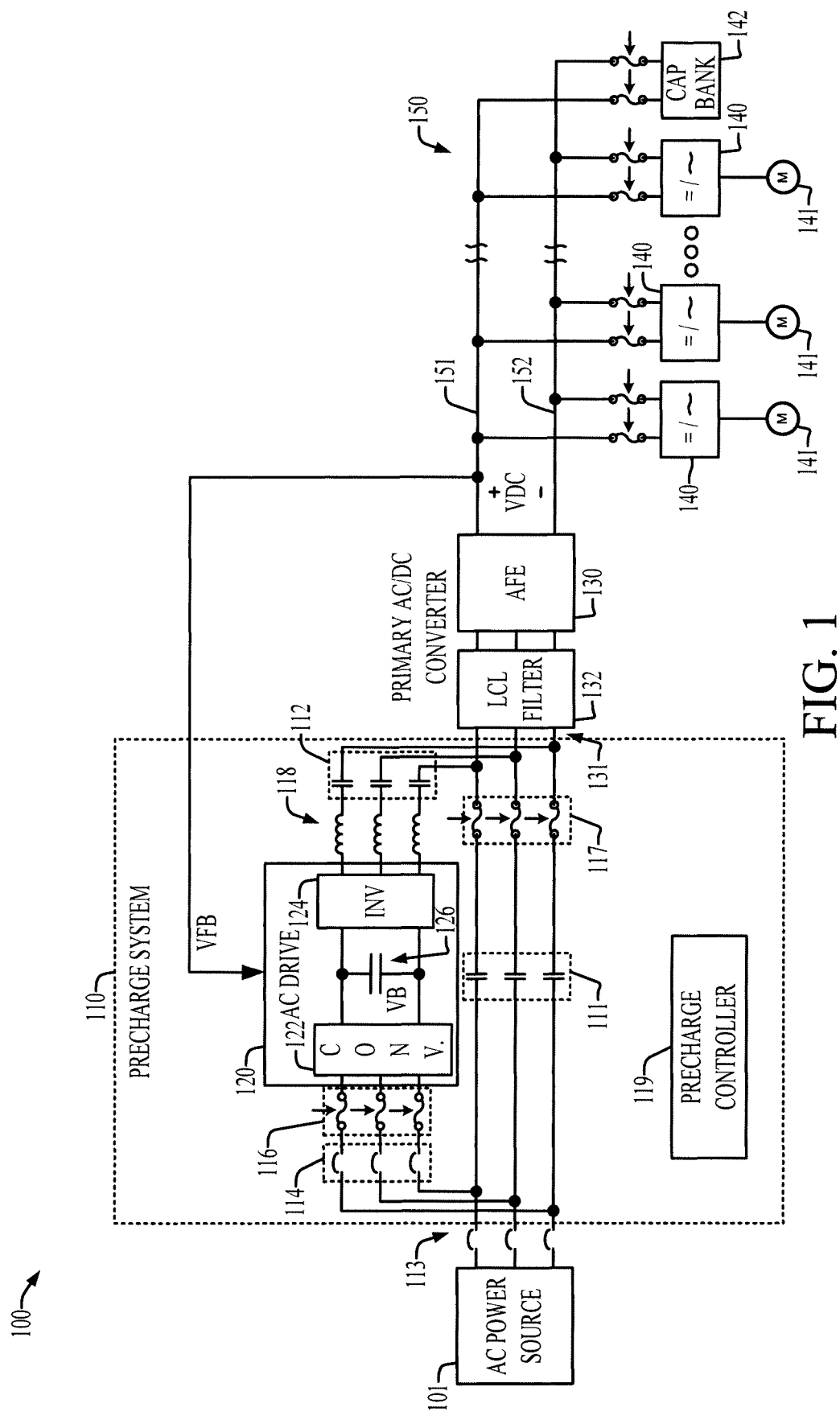
FIG. 1 is a schematic diagram of a power conversion system with a shared DC bus, a primary AC to DC converter with an AFE rectifier, and a precharge system with a VFD to precharge the DC bus.
Figure 2:
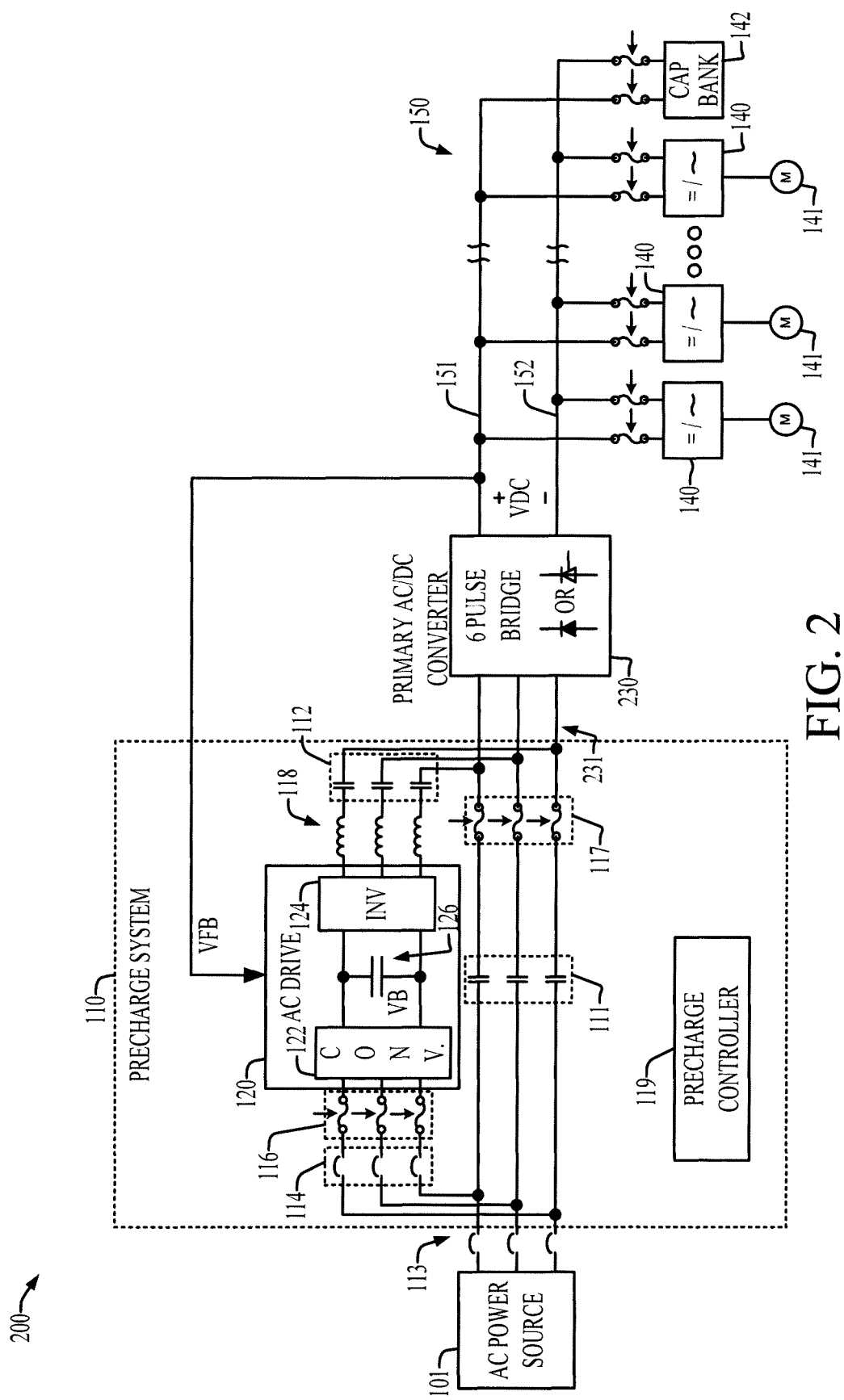
FIG. 2 is a schematic diagram of another power conversion system with a shared DC bus, a primary AC to DC converter with a six-pulse bridge rectifier, and a precharge system with a VFD to precharge the DC bus.
Figure 3:
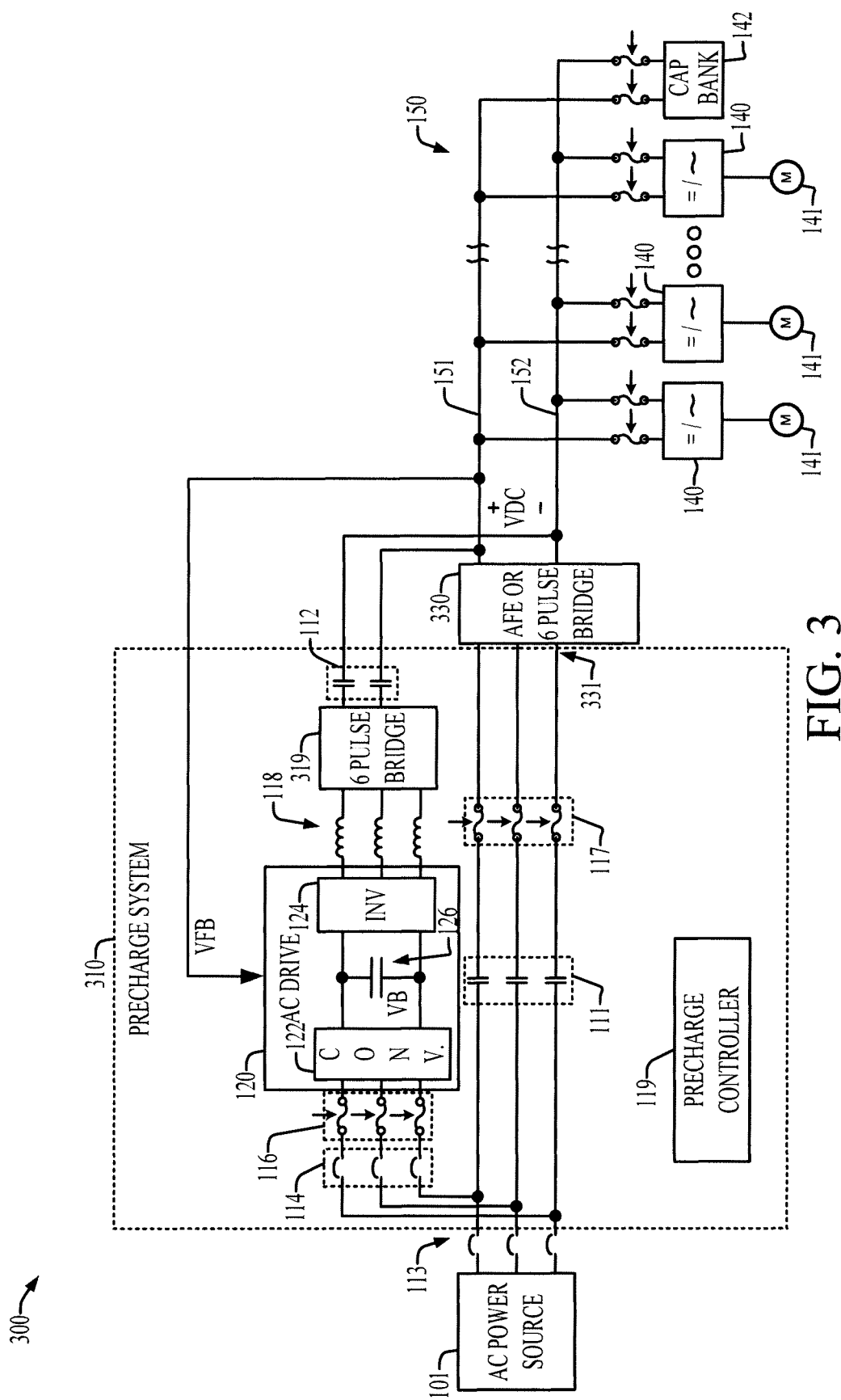
FIG. 3 is a schematic diagram of another power conversion system with a shared DC bus, a primary AC to DC converter, and a precharge system with a VFD and a bridge rectifier to precharge the DC bus.

Referring initially to FIGS. 1-3, FIG. 1 shows a power conversion system 100 includes a precharging system that uses a VFD in a precharging circuit branch to provide small and scalable precharging solution for a shared bus system. The system 100 of FIG. 1 uses a primary AC to DC converter with an AFE rectifier, and a precharge system with a VFD to precharge the DC bus. FIG. 2 shows another example power conversion system with a shared DC bus, a primary AC to DC converter with a six-pulse bridge rectifier, and a precharge system with a VFD to precharge the DC bus. FIG. 3 shows yet another example, in which a precharge system has a VFD and a bridge rectifier to precharge the DC bus.

The use of a VFD with an AC input provides advantages over previous DC bus precharging systems and techniques. Simple precharge circuits include resistors and contactors that can be used on AC inputs or DC outputs of a rectifier to charge the bus capacitance. The precharge resistors are uncontrolled system component and act as the limiter for the inrush charging currents of the system capacitance, thereby limiting the charging time. When the system capacitors completely charged, the system control switches the power flow between the precharge and main branches in circuitry. More complicated precharge circuits include AC or DC controlled system components such as SCRs, IGBTs as part of the main rectifier and precharge circuitry controls the inrush charging currents of the system capacitance during precharge operation, and then start conducting the main power flow after precharging is completed. Other precharging circuits suffer from limitations of on-off duty cycling when using precharge resistors, as well as long and fixed precharging time as a function of AC line conditions. In addition, simple precharge resistor approaches do not have current limiting control circuitry. Other solutions, moreover, suffer from limited protection on precharge power-up from short circuit faults in common DC bus system (e.g., fuse protection coordination with precharge resistors is difficult). In addition, simple precharge resistor systems provide only limited protection from ground faults in a common DC bus system on precharge power up, and these approaches typically require custom engineering system design of the precharge circuit component ratings for a given application.

FIG. 1 shows a power conversion system 100 with a shared DC bus, a primary AC to DC converter with an active front end (AFE) rectifier, and a precharge system with a VFD to precharge the shared DC bus. The system 100 operates from three phase AC power supplied by an AC power source 101. In other implementations, single phase AC input power can be used, or other multi-phase power having N phases, where N is greater than 3. The system 100 includes a precharge system 110 with separate first and second circuit branches to enable DC bus precharging in a first operating mode (e.g., PRECHARGE mode) and normal operation in a second operating mode (NORMAL). The first circuit branch includes a first contactor 111, and the second circuit branch includes a second contactor 112. The precharge system 110 includes a first input 113 configured to be coupled to the AC power source 101. The second circuit branch includes the second contactor 112 as well as a disconnect switch 114 coupled to the first input 113. In the illustrated example, the first contactor 111, the second contactor 112 and the disconnect switch 114 are all three-phase components, although not a strict requirement of all possible implementations. The second circuit branch in one implementation further includes an overcurrent protection circuit 116, such as a three-phase resettable circuit breaker or fuses. In other implementations, the overprotection circuit 116 is omitted. The first circuit branch in the illustrated example includes an overprotection circuit 117, such as a three-phase circuit breaker or fuses. In other implementations, the overprotection circuit 117 is omitted. The second circuit branch further includes a three-phase inductor circuit (hereinafter referred to as the inductor) having three inductors 118 in the three respective phase lines of the second circuit branch.

The precharge system 110 in one example includes a precharge controller 119 with suitable control outputs configured to operate the first and second contactors 111 and 112 and the disconnect switch 114. In accordance with certain aspects of the present disclosure, the second circuit branch also includes a variable frequency drive (VFD) 120 having an AC input and an AC output. In one implementation, the precharge controller 119 includes suitable control outputs to selectively operate the VFD 120. In another implementation, the precharge controller 119 is implemented in one or more programmed processors of the VFD 120.

In the illustrated example, the VFD 120 is an AC to AC converter. The example VFD 120 includes a converter 122 (e.g., a rectifier) having an AC input coupled to the disconnect switch 114 (e.g., directly or through any included fuses 116), as well as an internal (e.g., second) DC bus circuit 126 coupled to a DC output of the rectifier 122. In one example, the converter 122 is or includes a passive rectifier, such as a six-pulse diode bridge rectifier circuit. In another example, the converter 122 is or includes an active front end (AFE) switching rectifier. The second converter 122 provides and regulates an internal bus voltage VB across a bus capacitor of the DC bus circuit 126. The VFD 120 further includes an inverter 124 having a DC input coupled to the second DC bus circuit 126 and an AC output coupled to the second contactor 112 through the inductor 118.

The system also includes a primary AC to DC converter, in one example having an AFE rectifier 130 coupled directly or indirectly to a three phase AC input 131. In the example of FIG. 1, the primary AC to DC converter includes an input filter circuit 132. In one example, the filter circuit 132 is a three-phase inductor-capacitor-inductor (LCL) filter, including two inductors (not shown) connected in series with one another and each of the three respective phases, as well as three capacitors individually coupled in a Y circuit between a common node (e.g., a local neutral) and a respective joining node that joins the two inductors of a corresponding one of the respective phases. In other implementations, other forms of rectifiers can be used, with or without an input filter circuit. The primary AC to DC converter includes a DC output of the AFE rectifier 130.

The DC output of the rectifier 130 provides a main DC bus voltage VDC to drive multiple loads having DC inputs, in this example including multiple inverters 140 and respective driven motors 141, as well as a DC bus capacitor bank 142. The DC output of the rectifier 130 and the DC loads 140, 142 are coupled to a shared DC bus circuit 150 (e.g., DC bus system) that includes a first (e.g., positive or "+") line or node 151 and a second (e.g., negative or "−") line or node 152.

The precharge controller 119 operates in a first mode to charge the main DC bus circuit 150 to a threshold value of the DC bus voltage VDC, and thereafter operates in a second mode for normal operation of the primary AC to DC converter 130, 132. In one example, with the precharge controller 119 implemented in one or more processors of the VFD 120, the operating mode of the precharge system 110 is controlled at least in part based on a feedback signal VFB that represents the DC bus voltage VDC. FIG. 1 shows one example in which a feedback connection is provided from the first DC bus line 151 to the VFD 120 in order to selectively implement the first or second operating modes according to the DC bus voltage VDC of the DC bus circuit 150. The first contactor 111 is closed and the second contactor 112 is opened during normal operation in the second mode.

As further shown in FIG. 1, the disconnect switch 114 is coupled between the first input 113 and the AC input of the VFD 120, the VFD 120 is coupled between the disconnect switch 114 and the inductor 118, the inductor 118 is coupled between the AC output of the VFD 120 and the second contactor 112, and the second contactor 112 is coupled between the inductor 118 and the primary AC to DC converter 130, 132. In this example, moreover, the outputs of the first contactor 111 and the second contactor 112 are coupled together and to the input 131 of the primary AC to DC converter 130, 132, although not a strict requirement of all possible implementations. In the illustrated example, moreover, the second contactor 112 is coupled between the inductor 118 and the input 131 of the AC to DC converter 130, 132, although not a strict requirement of all possible implementations.

The controller 119 in one example is a processor that implements precharge in and normal mode operation according to program instructions stored in an electronic memory, such as a memory of the VFD 120. The controller 119 is configured in one example to open the first contactor 111 and close the second contactor 112 and the disconnect switch 114 in the first mode PRECHARGE, so as to prevent direct current flow from the first input 113 to the AC to DC converter 130 and to allow current flow from the AC output of the VFD 120 through the inductor 118. In one implementation, the controller 119 implements the first mode to charge up the DC bus voltage VDC until VDC exceeds a threshold value. In the second mode NORMAL, the controller 119 operates to close the first contactor 111 and open the second contactor 112 and the disconnect switch 114, in order to allow direct current flow from the first input 113 to the AC to DC converter 130, 132 and to prevent current flow from the AC output of the VFD 120 through the inductor 118.

In one example, the precharge system 110 in FIG. 1 implements adjustable and scalable precharging functions or options utilizing a standard AC VFD (e.g., variable speed drive) with an adjustable inverter output voltage and frequency (e.g., adjustable voltage and frequency or AVAF control) as a component for precharging the common or shared DC bus circuit 150 with multiple inverters 140 and potentially large DC bus capacitance via the capacitor bank 142. The VFD 120 in one example implements charge rate control according to the feedback voltage signal VFD and current limiting to facilitate both fast precharging and protection against over-currents and/or short circuit protection. The VFD 120 and the main AC to DC converter 130, 132 operate concurrently during the first mode, with the VFD 120 providing input AC power to the input 131 of the main AC to DC converter 130, 132, and the AFE provides DC charging current to charge the bus capacitance of the shared DC bus circuit 150. The precharge VFD 120 in one example provides precise control of the precharge operation such as charging time, current limiting, short-circuit protection and ground fault protection, and verifies the health of the shared DC bus circuit 150 after startup diagnostic checking, as shown, for example, in FIG. 4 below.

FIGS. 2 and 3 show further non-limiting examples. FIG. 2 shows a power conversion system 200 with a shared DC bus, a six-pulse bridge rectifier 230 as the primary AC to DC converter, and a precharge system 110 with a VFD 120 to precharge the DC bus circuit 150 as generally described above. In this example, the bridge rectifier 230 includes 6 rectifier diodes or SCRs configured in a rectifier circuit with an AC input 231 and a DC output coupled to the DC bus circuit 150. FIG. 3 shows another power conversion system 300 with a shared DC bus circuit 150 and a precharge system 310 having a VFD 120 as described above in connection with FIG. 1. The precharge system 310 in this example includes a comprising a rectifier 319 coupled between the inductor 118 and the second contactor 112. In one example, the rectifier 319 is a six-pulse bridge rectifier having 6 rectifier diodes or SCRs configured in a rectifier circuit with an AC input coupled to the inductor, and a DC output coupled through the contactor 112 to the DC lines 151 and 152 of the DC bus circuit 150. The primary AC to DC converter in the system 300 is an AFE or bridge rectifier 330 with an AC input 331 and a DC output coupled to the DC bus circuit 150. The second contactor 112 in this example has two contacts to selectively allow DC current to flow between the DC output of the rectifier 319 in the first mode to directly precharge the DC bus circuit 150, or to prevent DC current flow from the rectifier 319 to the DC bus circuit 150 in the second mode. In one example, the primary AC to DC converter 330 is a second bridge rectifier having an AC input coupled to the first contactor 111 and a DC output coupled to the DC bus circuit 150. In another example, the primary AC to DC converter 330 includes an AFE rectifier having an AC input coupled to the first contactor 111 and a DC output coupled to the DC bus circuit 150.

Figure 4:
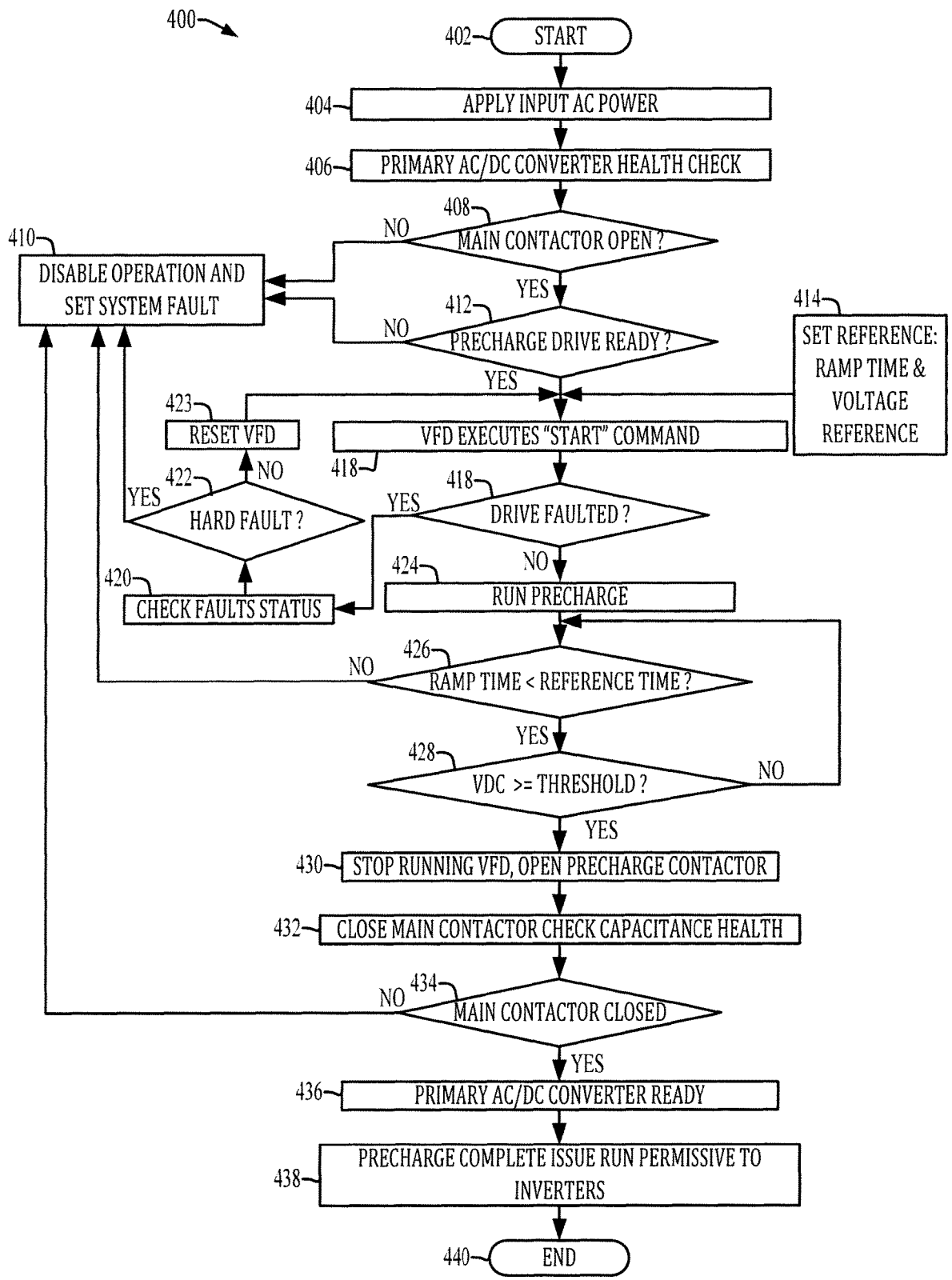
FIG. 4 is a flow diagram of a method of precharging a DC bus circuit.

FIG. 4 shows a method 400 for precharging a DC bus circuit, such as the DC bus circuit 150 described above in connection with FIGS. 1-3. In one example, the method 400 is implemented by the precharge controller 119 according to program instructions stored in the electronic memory, such as a memory of the VFD 120 in FIG. 1. The method 400 begins at 402 and includes coupling the variable frequency drive VFD 120 between the AC power source 101 and the shared DC bus circuit 150. In one implementation, the controller 119 provides this interconnection by opening the first contactor 111 and closing the second contactor 112 in FIG. 1 above and applying input AC power at 404 in FIG. 4. The method 400 in one example also includes the controller 119 performing an AC/DC converter health check at 406.

In one implementation, the controller 119 makes a determination at 408 as to whether the main contactor (e.g., the first contactor 111) is open. If not (NO at 408 in FIG. 4), the controller 119 disables operation and such a system fault at 410. Otherwise (YES at 408), the controller 119 makes a determination at 412 as to whether the precharge drive (e.g., VFD 120 in FIG. 1) is ready. If not (NO at 412), the controller 119 disables operation and sets the system fault at 410. In addition, the controller 119 in one example sets one or more references at 414 in FIG. 4, such as based on user input or other configuration source, including ramp time and a desire DC bus voltage reference.

If the precharge VFD 120 is ready (YES at 412), the controller 119 causes the VFD 120 to execute a start command at 416, and the controller 119 determines whether the VFD drive is faulted at 418. If so (YES at 418), the controller 119 checks the fault status at 420 to determine whether a hard fault exists at 422. If so (YES at 422), the controller 119 disables operation and sets the system fault at 410. If there is no hard fault (NO at 422), the controller 119 resets the VFD 120 at 423, and the VFD 120 again executes the start command at 416.

Once the VFD drive has started with no faults (NO at 418), the controller 119 runs the precharge operation in the first mode at 424 to charge the DC bus circuit 150 with the VFD 120 until a voltage VDC of the DC bus circuit 150 reaches a threshold value or a preset maximum ramp time reference value has been exceeded. In one example, the controller 119 operates the VFD 120 at or near a line frequency of the AC power source 101, although not a strict requirement of all possible implementations. In another example, the controller 119 operates the VFD 120 at a higher frequency than the line frequency, for example, two or three times the line frequency of the AC power source 101. In the illustrated example, the controller 119 determines at 426 whether a predetermined reference time has been exceeded (e.g., determines whether the ramp time is less than a reference time). If so (NO at 426), the controller 119 disables operation and sets the system fault at 410. If the reference time has not been exceeded (YES at 426), the controller 119 makes a determination at 428 as to whether the DC bus voltage VDC is reached or exceeded a threshold value. If the threshold DC bus voltage has not yet been reached (NO at 428), the method 400 continues at 426 and 428 to continue precharging the DC bus circuit 150.

In response to the voltage VDC of the DC bus circuit 150 reaching the threshold value without exceeding the predetermined reference time limit (YES at 428), the method proceeds to 430 where the controller 119 stops running the VFD 120 and opens the second contactor 112 to disconnect the VFD 120 from the DC bus circuit 150. At 432, the controller 119 closes the first (e.g., main) contactor 111 to couple the primary AC to DC converter (e.g., 130, 132 in FIG. 1) to the DC bus circuit 150 and checks the DC bus capacitance health. In one example, the controller 119 controls the timing between opening the second contactor 112 and closing the first contactor 111 to provide a non-zero (e.g., break before make) switching time delay. This advantageously avoids synchronizing the VFD frequency (e.g., the output frequency of the inverter 124) with the frequency and phase of the AC power source 101. The controller 119 in one example verifies at 434 whether the first contactor is closed. If not (NO at 434), the controller 119 disables operation and sets the system fault at 410. If so (YES at 434), the controller 119 determines that the primary AC to DC converter (e.g., the AFE rectifier 130 in FIG. 1) is ready at 436, and the AFE rectifier 130 regulates the voltage VDC of the DC bus circuit 150. At 438 in FIG. 4, the controller 119 determines that the precharge operation is complete and issues a run permissive to the inverters 140 coupled to the shared DC bus circuit 150, and the method 400 and at 440.

Figure 5:
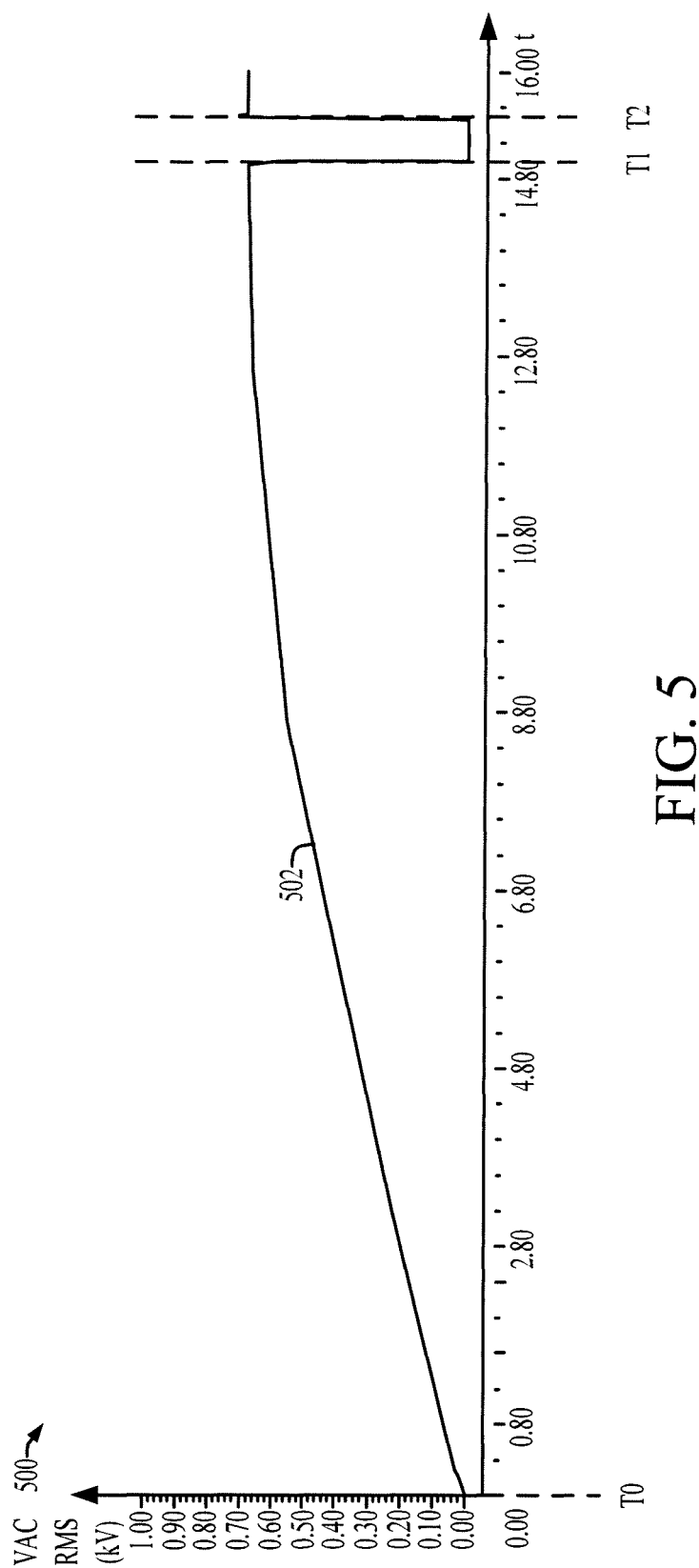
FIG. 5 is a graph of AC voltage at the LCL filter input during DC bus precharging in the system of FIG. 1.
Figure 6:
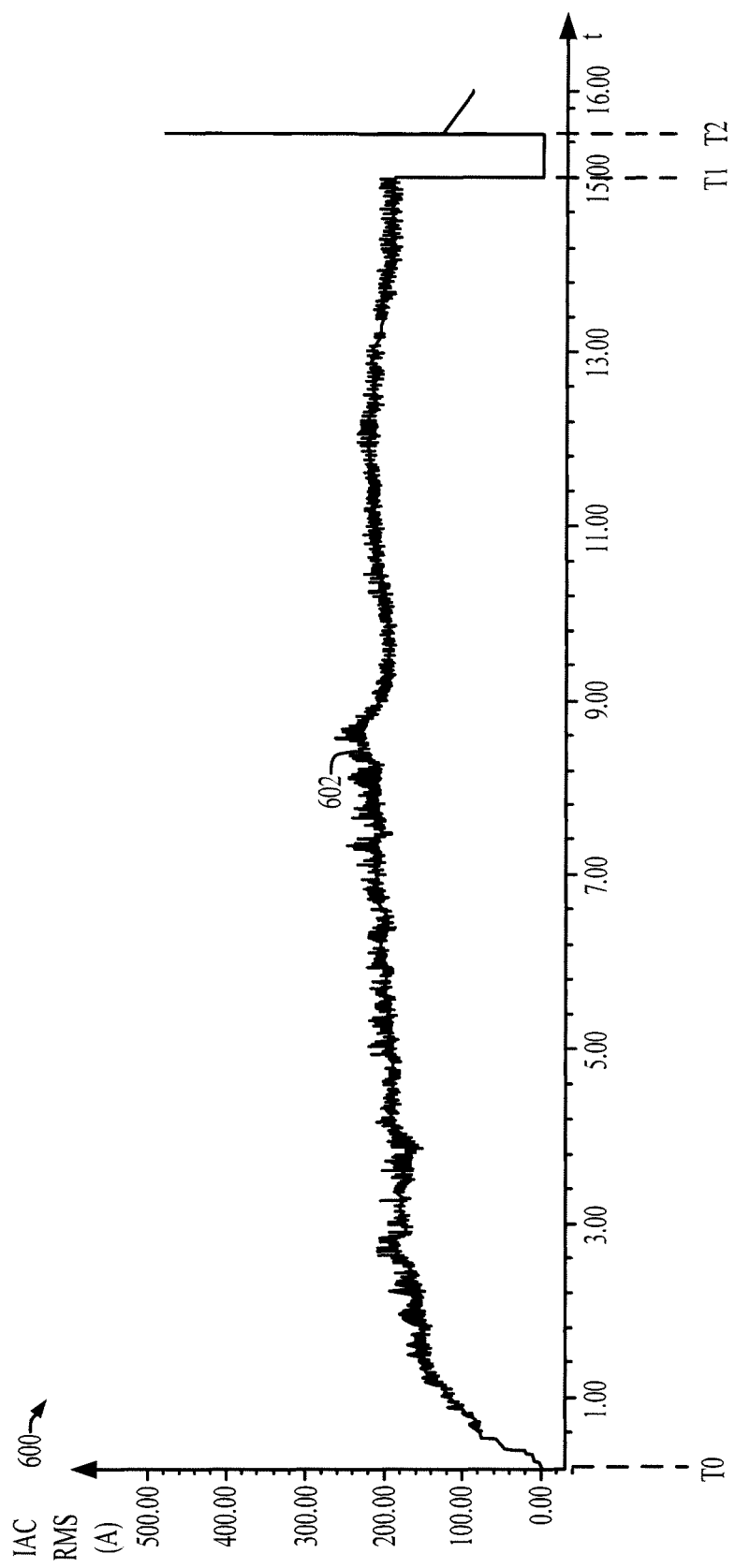
FIG. 6 is a graph of AC input current at the LCL filter input during DC bus precharging in the system of FIG. 1.
Figure 7:
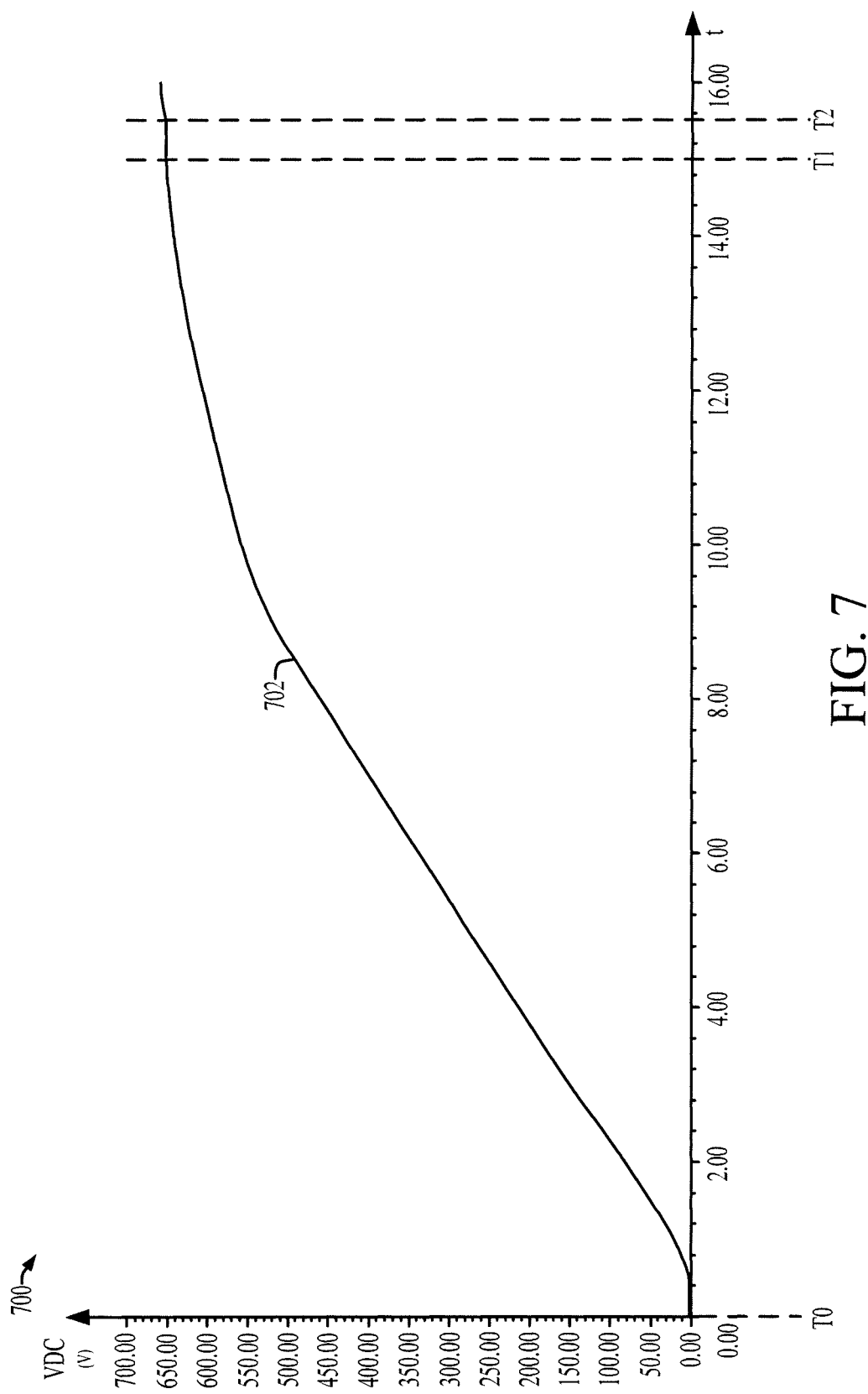
FIG. 7 is a graph of DC bus voltage during precharging in the system of FIG. 1.

FIGS. 5-7 show example waveforms illustrating the controlled precharge in operation of the above described precharge system 100 time of FIG. 1 with a DC bus system capacitance of approximately 2f (e.g., capacitor bank 142 in FIG. 1) in less than 15 seconds. FIG. 5 is a graph 500 with a curve 500 to showing RMS AC voltage at the LCL filter input during DC bus precharging in the system 100 of FIG. 1, in which the precharge and begins at time T0, and the filter input voltage reaches 476 VRMS in the controller 119 opens the second contactor 112 at time T1, approximately 15 seconds after the precharging began at T0 in one example. A short time later at T2, the controller 119 closes the main first contactor 111, by which the AC power source 101 begins providing AC input voltage at the input to the filter circuit 132. FIG. 6 shows a graph 600 with a curve 602 of AC input current at the LCL filter input during DC bus precharging in the system of FIG. 1 corresponding to the example of FIG. 5. In this example, the precharging current increases from zero to a peak of approximately 92 A RMS during precharging in the first mode. In this regard, the use of the VFD 120 to provide AC input power to the primary AC to DC converter 130, 132 facilitates current limit control, in addition to short circuit protection. FIG. 7 shows a graph 700 with a curve 702 that illustrates the DC bus voltage VDC during precharging in the system of FIG. 1 for the example shown in FIGS. 5 and 6. In one example, the DC bus voltage VDC begins at 0 V and the controller 119 continues the precharging until the DC bus voltage VDC reaches a predetermined threshold value, such as 652 V. Unlike other approaches, the use of the VFD 120 for precharging facilitates precharge operations were the initial DC bus voltage VDC is non-zero.

The described examples provide a variety of advantages, in which the VFD 120 can be used with shared DC bus systems that have uncontrolled rectifier diode primary rectifiers (e.g., FIGS. 2 and 3 above), as well as in systems having controlled rectifier (e.g., SCR) front ends. In addition, the example precharge systems 110, 310 can be used with systems having LCL filters and IGBT AFEs (e.g., FIGS. 1 and 3). Moreover, the use of the VFD 124 precharge and facilitates control of capacitance charging time, independent of the initial DC bus voltage when the precharge operation began, and the described precharge systems 110 and 310 facilitate limiting of the charging current. Moreover, the VFD-based precharge systems 110 and 310 advantageously provide short-circuit protection of the charging circuitry and DC bus components, as well as the capability to provide ground fault protection of the charging circuitry and DC bus components. In addition, the example precharge systems 110 and 310 provide diagnostics of the system capacitance to increase its reliability. Additional benefits include the ability to optimize the size and cost of the VFD inductor 118 in view of the controlled maximum precharge ramp time, without the need to oversize these components to operate for much longer times. For example, pre-charging in only 15 seconds facilitates reduced system downtime, and the inductor 118 need not be sized to operate for 30 minutes in one example. The disclosed examples also facilitate elimination of internal precharge DC link inductors sometimes used in other precharge in systems, thereby providing additional cost savings and reduced harmonics. In practice, once the precharge operations are completed, the VFD 120 of the precharge system 110, 310 can be taken out of service to improve long time reliability.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. In accordance with further aspects of the present disclosure, a non-transitory computer readable medium is provided, such as a computer memory, a memory within a power converter control system (e.g., controller memory, a CD-ROM, floppy disk, flash drive, database, server, computer, etc.), which includes computer executable instructions for performing the above-described methods. The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A system, comprising:
    a first input configured to be coupled to an AC power source;
    an AC to DC converter with an input and a DC output coupled to a DC bus circuit;
    a first contactor coupled in a first circuit branch between the first input and the input of the AC to DC converter; and
    a second circuit branch, including: a second contactor; an inductor; a disconnect switch and a variable frequency drive (VFD) having an AC input and an AC output, the disconnect switch coupled between the first input and the AC input of the VFD, the VFD coupled between the disconnect switch and the inductor, the inductor coupled between the AC output of the VFD and the second contactor, and the second contactor coupled between the inductor and the DC bus circuit.

2. The system of claim 1, wherein the second contactor is coupled between the inductor and the input of the AC to DC converter.

3. The system of claim 2, wherein the AC to DC converter includes an active front end (AFE) rectifier having an AC input and a DC output coupled to a DC bus circuit.

4. The system of claim 3, further comprising a filter circuit coupled between the input of the AC to DC converter and an AC input of the AFE rectifier.

5. The system of claim 4, wherein the VFD comprises: a converter having an AC input coupled to the disconnect switch; a second DC bus circuit coupled to a DC output of the converter; and an inverter having a DC input coupled to the second DC bus circuit and an AC output coupled to the second contactor.

6. The system of claim 3, wherein the VFD comprises: a converter having an AC input coupled to the disconnect switch; a second DC bus circuit coupled to a DC output of the converter; and an inverter having a DC input coupled to the second DC bus circuit and an AC output coupled to the second contactor.

7. The system of claim 2, wherein the AC to DC converter is a bridge rectifier having an AC input and a DC output coupled to a DC bus circuit.

8. The system of claim 7, wherein the VFD comprises: a converter having an AC input coupled to the disconnect switch; a second DC bus circuit coupled to a DC output of the converter; and an inverter having a DC input coupled to the second DC bus circuit and an AC output coupled to the second contactor.

9. The system of claim 2, wherein the VFD comprises: a converter having an AC input coupled to the disconnect switch; a second DC bus circuit coupled to a DC output of the converter; and an inverter having a DC input coupled to the second DC bus circuit and an AC output coupled to the second contactor.

10. The system of claim 1, further comprising a bridge rectifier coupled between the inductor and the second contactor.

11. The system of claim 10, wherein the second contactor is coupled between a DC output of the bridge rectifier and the DC bus circuit.

12. The system of claim 11, wherein the AC to DC converter is a second bridge rectifier having an AC input coupled to the first contactor, and a DC output coupled to a DC bus circuit.

13. The system of claim 12, wherein the VFD comprises: a converter having an AC input coupled to the disconnect switch; a second DC bus circuit coupled to a DC output of the converter; and an inverter having a DC input coupled to the second DC bus circuit and an AC output coupled to the second contactor.

14. The system of claim 11, wherein the AC to DC converter includes an active front end (AFE) rectifier having an AC input and a DC output coupled to a DC bus circuit.

15. The system of claim 14, wherein the VFD comprises: a converter having an AC input coupled to the disconnect switch; a second DC bus circuit coupled to a DC output of the converter; and an inverter having a DC input coupled to the second DC bus circuit and an AC output coupled to the second contactor.

16. A precharge system, comprising:
a first input configured to be coupled to an AC power source;
a first circuit branch adapted to be coupled between the first input and an AC to DC converter, the first circuit branch having a first contactor;
a second circuit branch having: a disconnect switch coupled to the first input; a variable frequency drive (VFD) having an AC input coupled to the disconnect switch; an inductor coupled to an AC output of the VFD; and a second contactor coupled to the inductor; and
a controller configured to: in a first mode, open the first contactor and close the second contactor and the disconnect switch to prevent direct current flow from the first input to the AC to DC converter and allow current flow from the AC output of the VFD through the inductor; and in a second mode, close the first contactor and open the second contactor and the disconnect switch to allow direct current flow from the first input to the AC to DC converter and prevent current flow from the AC output of the VFD through the inductor.

17. The precharge system of claim 16, wherein outputs of the first contactor and the second contactor are coupled together and to an input of the AC to DC converter.

18. The precharge system (310) of claim 16, further comprising a bridge rectifier (319) coupled between the inductor and the second contactor.

19. A method for precharging a DC bus circuit, the method comprising:
coupling a variable frequency drive (VFD) between an AC power source and a DC bus circuit;
charging the DC bus circuit with the VFD until a voltage of the DC bus circuit reaches a threshold value;
in response to the voltage of the DC bus circuit reaching the threshold value:
disconnecting the VFD from the DC bus circuit;
coupling an AC to DC converter to the DC bus circuit; and
regulating the voltage of the DC bus circuit using the AC to DC converter.

20. The method of claim 19, wherein charging the DC bus circuit with the VFD includes operating an inverter of the VFD at or near a line frequency of the AC power source.

* * * * *